United States Patent
Gerrese et al.

(10) Patent No.: US 11,836,874 B2
(45) Date of Patent: Dec. 5, 2023

(54) AUGMENTED IN-VEHICLE EXPERIENCES

(71) Applicant: GM Cruise Holdings LLC, San Francisco, CA (US)

(72) Inventors: Alexander Willem Gerrese, San Francisco, CA (US); Jennifer Devar McKnew, San Francisco, CA (US); Livia Johanna, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1 day.

(21) Appl. No.: 17/703,386

(22) Filed: Mar. 24, 2022

(65) Prior Publication Data

US 2023/0306693 A1 Sep. 28, 2023

(51) Int. Cl.
G06T 19/00 (2011.01)
G09G 3/00 (2006.01)
G06V 20/58 (2022.01)

(52) U.S. Cl.
CPC .......... G06T 19/006 (2013.01); G06V 20/58 (2022.01); G09G 3/002 (2013.01); G09G 2380/10 (2013.01)

(58) Field of Classification Search
None
See application file for complete search history.

(56) References Cited

U.S. PATENT DOCUMENTS

| 10,809,081 | B1* | 10/2020 | Kentley-Klay | ........ G08G 1/202 |
| 2018/0007414 | A1 | 1/2018 | Li et al. | |
| 2018/0211414 | A1* | 7/2018 | Cronin | .................. G05D 1/021 |
| 2020/0258306 | A1* | 8/2020 | Forutanpour | ............. G06T 9/00 |
| 2021/0192856 | A1* | 6/2021 | Lee | ......................... G06T 19/20 |
| 2022/0063662 | A1* | 3/2022 | Sprunk | ............ B60W 60/0027 |

* cited by examiner

Primary Examiner — Tapas Mazumder
(74) Attorney, Agent, or Firm — Akona IP PC

(57) ABSTRACT

Systems and methods for augmented in-vehicle experiences. In particular, systems and methods for an immersive in-vehicle experience are provided, with customizable virtual and augmented reality options. Systems and techniques are provided for vehicles to perform real-time detection and augmentation of the real world environment, including tracked objects and buildings in the real world environment. The vehicles use intelligently matched vehicle sensor data, map data, and other source data for detection and augmentation of the environment. In some examples, procedurally generated three-dimensional (3D) environments are provided, which are based on a current ride route and surrounding real world environment.

20 Claims, 8 Drawing Sheets

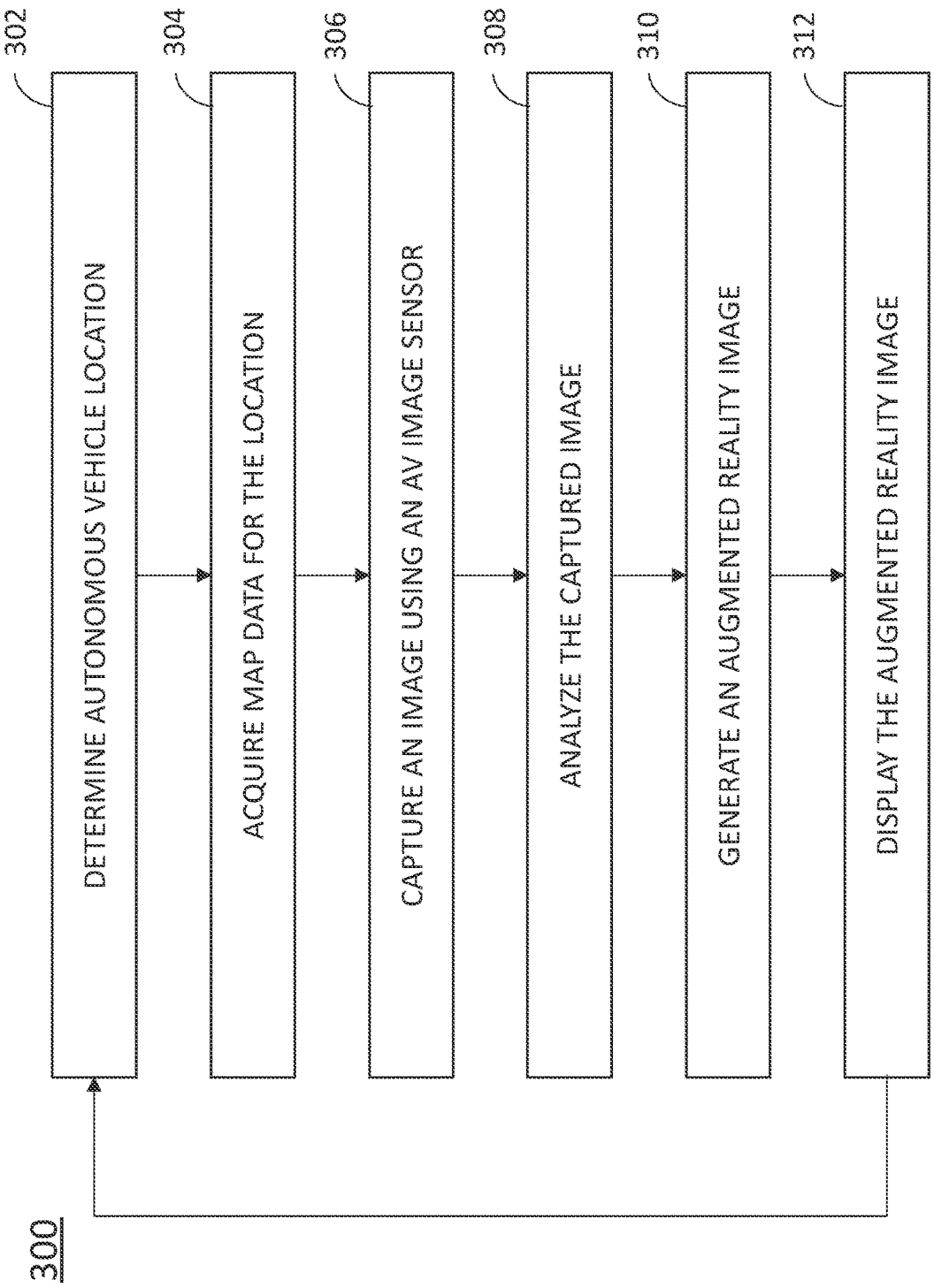

AUGMENTED IN-VEHICLE EXPERIENCES

FIELD OF THE DISCLOSURE

The present disclosure relates generally to autonomous vehicles (AVs) and to systems and methods for augmented vehicle experiences.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick-up passengers and drive the passengers to selected destinations. The vehicles can also be used to pick-up packages and/or other goods and deliver the packages and/or goods to selected destinations.

Autonomous vehicles can be used to provide rides to passengers for various types of errands and outings. Often, two or more passengers travel together in an autonomous vehicle to a planned event. A passenger can use any available rideshare service for these purposes, with potentially little difference in ride experience. A regular autonomous vehicle ride may feel uneventful and mundane to passengers, resulting in the ride being a utilitarian and transactional experience.

SUMMARY

Systems and methods are provided for augmented in-vehicle experiences. In particular, systems and methods for an immersive in-vehicle experience are provided, with customizable virtual and augmented reality options. Autonomous vehicles are provided that can perform real-time detection and augmentation of the real world environment, including tracked objects and buildings in the real world environment. The autonomous vehicles use intelligently matched vehicle sensor data, map data, and other source data for detection and augmentation of the environment. In some examples, procedurally generated three-dimensional (3D) environments are provided, which are based on a current ride route and surrounding real world environment.

According to one aspect, a method for augmented reality in a vehicle, comprises determining vehicle ride data, including vehicle location and vehicle sensor data; acquiring map data for the vehicle location from a central computer; analyzing vehicle sensor data including captured images to identify image objects; generating an augmented reality image by augmenting the captured images based on the identified image objects, the vehicle location, and the map data; and projecting the augmented reality image in the vehicle. In some implementations, the vehicle is an autonomous vehicle.

In some implementations, generating the augmented reality image further comprises matching vehicle sensor data with the map data. In some implementations, determining autonomous vehicle sensor data includes capturing an image using an autonomous vehicle image sensor. In some implementations, determining autonomous vehicle sensor data includes processing light detection and ranging (LIDAR) data, radio detection and ranging (RADAR) data, weather data, and detected object data. In some implementations, projecting the augmented reality image includes at least one of projecting the augmented reality image on at least one window, projecting the augmented reality image in augmented reality glasses, and projecting the augmented reality image on an in-vehicle screen. In some implementations, generating the augmented reality image further comprises generating the augmented reality image based on a ride route.

In some implementations, the identified image objects include buildings and wherein generating the augmented reality image further comprises changing an appearance of the buildings. In some implementations, generating the augmented reality image further comprises changing the captured images to adjust at least one of a time of day and weather. In some implementations, the map data includes time-period data from a different era and wherein generating the augmented reality image further comprises using the time-period data. In some implementations, the method further comprises generating an augmented reality sound and playing the sound in the autonomous vehicle. In some implementations, the augmented reality sound includes at least one of a weather sound and an animal sound. In some implementations, the augmented reality image includes a first image portion outside the autonomous vehicle and a second image portion inside the autonomous vehicle.

According to another aspect, an autonomous vehicle for providing an augmented reality environment, comprises a sensor suite including external vehicle sensors to sense an autonomous vehicle environment and generate sensor data; a perception system to receive the sensor data and to acquire map data and to use the map data and the sensor data to generate autonomous vehicle real world environment data; and an augmented reality system to: receive the real world environment data, receive an augmented reality user selection, generate an augmented reality environment based on the user selection, and project the augmented reality environment.

In some implementations, the augmented reality system projects the augmented reality environment on at least one vehicle window. In some implementations, the autonomous vehicle further includes an onboard computer configured to adjust autonomous vehicle cabin settings based on the augmented reality environment. In some implementations, the onboard computer is further to: receive an augmented reality system request, and adjust an autonomous vehicle route based on the request. In some implementations, the sensor data is at least one of image data, LIDAR data, weather data, and detected object data, and wherein the augmented reality system is to incorporate the sensor data into the augmented reality environment. In some implementations, the augmented reality system is further to match vehicle sensor data with the map data.

According to another aspect, an augmented reality environment comprises a central computer to transmit map data; and an autonomous vehicle including: a sensor suite including external vehicle sensors to sense an autonomous vehicle environment and generate sensor data; a perception system to receive the sensor data and to receive the map data and to use the map data and the sensor data to generate autonomous vehicle real world environment data; and an augmented reality system to: receive the real world environment data, receive an augmented reality user selection, generate an augmented reality environment based on the user selection, and project the augmented reality environment.

In some implementations, the central computer is further to store the map data, receive map data updates, and update the map data. In some implementations, the augmented reality system projects the augmented reality environment on at least one vehicle window. In some implementations, the system further comprises an onboard computer configured to adjust autonomous vehicle cabin settings based on the augmented reality environment.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which:

FIG. 3 is a diagram illustrating a method for an augmented reality experience, according to some embodiments of the disclosure;

DETAILED DESCRIPTION

Overview

Systems and methods are provided herein for augmented in-vehicle experiences. In particular, systems and methods for an immersive in-vehicle experience are provided, with customizable virtual and augmented reality options. Systems and techniques are provided for autonomous vehicles to perform real-time detection and augmentation of the real world environment, including tracked objects and buildings in the real world environment. The autonomous vehicles use intelligently matched vehicle sensor data, map data, and other source data for detection and augmentation of the environment. In some examples, procedurally generated three-dimensional (3D) environments are provided, which are based on a current ride route and surrounding real world environment.

In general, riding in ground transportation services can offer a window into reality. While that reality can sometimes be pleasant and even beautiful (e.g., rolling hills, beautiful architecture, sunny days, vibrant city centers), sometimes reality is harsh and not very pleasant (e.g., heavy traffic, poor weather, homelessness). Additionally, sometimes reality is simply boring. Passengers may want to escape from reality while riding from one place to another, but there is often no way to do so other than to focus on a small screen on a mobile device, which is inherently antisocial. This can make riding with others an isolated experience even when multiple people are physically spending time together in close quarters within a vehicle cabin.

Systems and methods are provided herein to augment and/or replace apparent reality in an autonomous vehicle to create a more engaging and exciting transportation experience. In some examples, providing an augmented and/or virtual reality autonomous vehicle experience can result in more satisfied and more loyal customers. The augments and/or virtual reality experience can be a shared imaginative experience for the passengers in a cabin, and it can be fun, educational, and social.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Augmented Experiences

Figure 1:
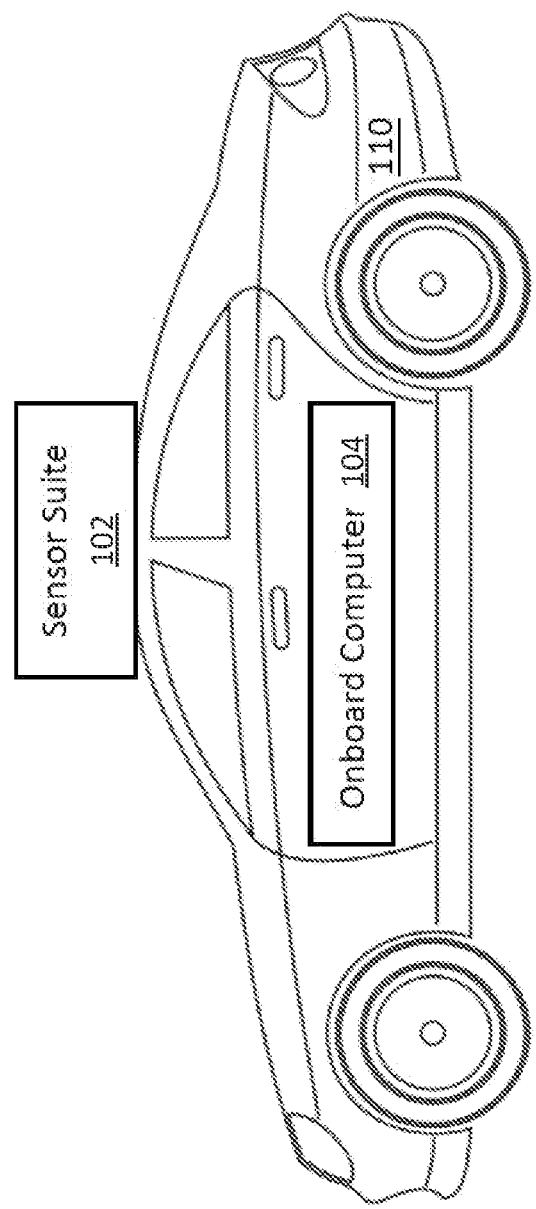
FIG. 1 is a diagram illustrating an autonomous vehicle, according to some embodiments of the disclosure.

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 includes systems and methods for providing augmented and/or virtual reality experiences to passengers.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. As described in greater detail below, information about the autonomous vehicle's environment as detected by the sensor suite 102 can be incorporated into one or more augmented reality experiences provided herein. In some examples, data from the sensor suite 102 can be used to update a map with information used to develop layers with waypoints identifying various detected items. In some examples, data from the sensor suite 102 can include information regarding crowds and/or lines outside and/or around selected venues. The data and map waypoints can be used by the augmented reality system in providing an augmented reality experience. Additionally, sensor suite 102 data can provide localized traffic information. In this way, sensor suite 102 data from many autonomous vehicles can continually provide feedback to the mapping system and the high fidelity map can be updated as more and more information is gathered. In some examples, the augmented reality system provided herein can use information gathered by other autonomous vehicles in the fleet, for example information in the mapping system, for updating augmented and/or virtual reality experiences as described in greater detail below.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, the augmented and/or virtual reality system receives processed sensed sensor suite 102 data from the onboard computer 104. In some examples, the augmented and/or virtual reality system receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). In some examples, as described in greater detail below, the autonomous vehicle 110 driving behavior is modified based on an augmented and/or virtual reality experience provided by the augmented reality system. For example, the augmented reality system can provide feedback to the autonomous vehicle 110 to indicate that selected driving behaviors are desirable at selected times. Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 2A:
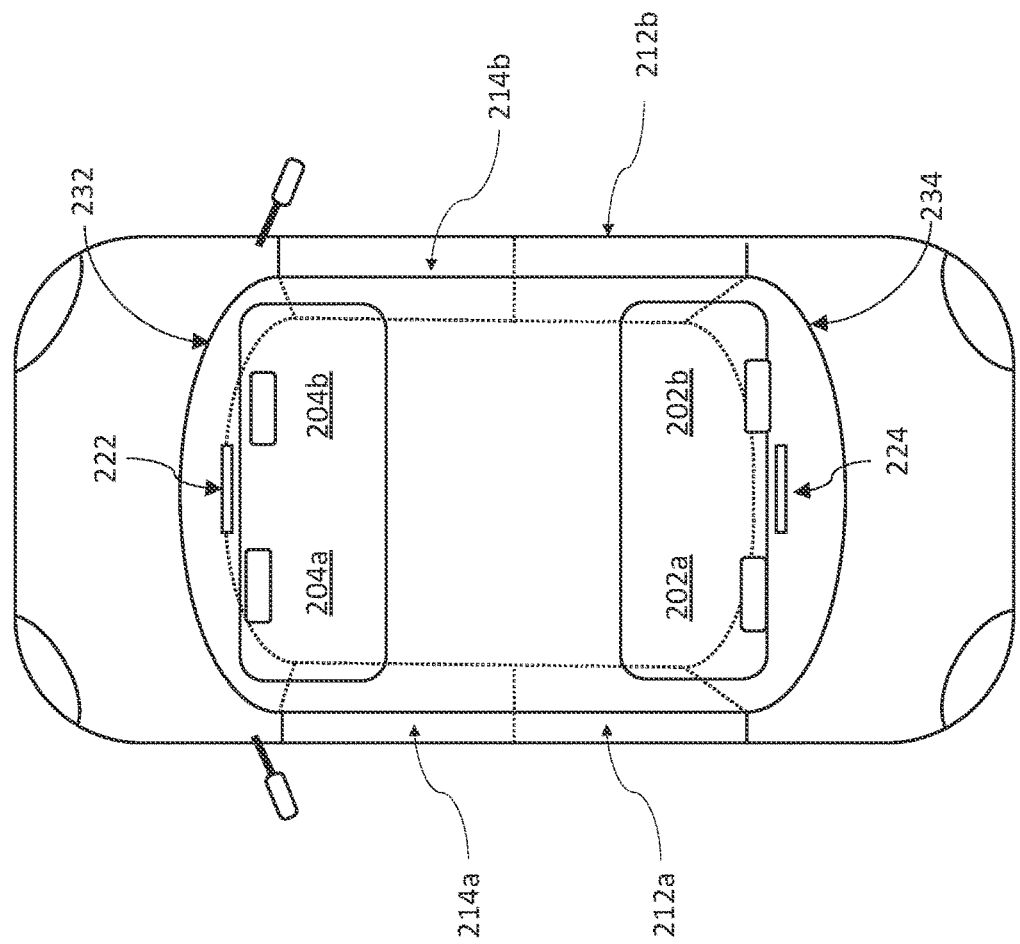
FIGS. 2A-2B show cutaway top views of an autonomous vehicle, according to some embodiments of the disclosure.

FIG. 2A shows a cutaway top view of the autonomous vehicle 200 with the interior seats facing each other, according to various embodiments of the disclosure. In particular, as shown in FIG. 2A, a first row of seats includes two seats 202a, 202b facing a first direction and a second row of seats includes two seats 204a, 204b facing the opposite direction. The seats 202a, 202b in the first row face a display screen 222 and a front window 232. Similarly, the seats 204a, 204b in the second row face a display screen 224 and a rear window 234. There are also side windows next to each seat, with a first side window 212a next to the left first row seat 202a, a second side window 212b next to the right first row seat 202b, a third side window 214a next to the left second row seat, and a fourth side window 214b next to the right second row seat. In some examples, each of the windows (the front window 232, rear window 234, and the side windows 212a, 212b, 214a, 214b) displays an augmented reality version of the environment external to the autonomous vehicle 200. In some examples, each of the windows (the front window 232, rear window 234, and the side windows 212a, 212b, 214a, 214b) displays a virtual reality scene of an environment external to the autonomous vehicle. The windows display a continuous scene such that a passenger in the vehicle 200 looking at any of the windows will see a portion of an entire augmented and/or virtual reality environment.

In various examples, the first row of seats includes more than two seats, and in some examples, the first row of seats includes three seats. Similarly, in various examples, the second row of seats includes more than two seats, and in some examples, the second row of seats includes three seats. In various examples, each seat is associated with a personal display screen, such that if the first row of seats includes three seats, there will be three personal display screens for the first row of seats and if the second row of seats includes three seats, there will be three personal display screens for the second row of seats.

In various implementations, the first 222 and second 224 display screens are positioned above the opposite row of seats, centered between the seats in the opposite row. In various implementations, the first 222 and second 224 display screens display general ride information, such as the current location on a map, the time to the next stop, and the location of the next stop. The first 222 and second 224 display screens may also display vehicle information such as the inside and/or outside temperature, the vehicle speed, and the vehicle license plate (or other identifying information). In some examples, the first 222 and second 224 display screens are used to display entertainment such as a show, movie, or game. In some examples, the display screens 222 and 224 can be positioned in other places in the vehicle and can be viewable from some or all passenger seats. For example, a display screen can be positioned along the side of the vehicle cabin.

Additionally, in various implementations, each seat 202a, 202b, 204a, 204b has a personal display screen, which can be lowered and/or retracted as needed. The personal display screen can display entertainment, such as a show, movie, or game, in addition to the augmented and/or virtual reality scene displayed on the vehicle windows.

According to various implementations, the passenger compartment includes a variety of sensors. In some examples, the passenger compartment is equipped with image sensors. The image sensors can include video cameras. Each image sensor is configured to capture images of a portion of the passenger compartment. In one example, each row of seats 202a, 202b and 204a, 204b has two or more image sensors above it and facing the opposite row of seats. In some examples, the passenger compartment sensors include microphones for capturing audio, e.g., voices of passengers in the passenger compartment.

In addition to the windows 232, 234, 212a, 212b, 214a, 214b, and the display screens 222 and 224, the passenger compartment can include other output devices. The additional output devices can include speakers as well as additional display screens. In some examples, the display screens include embedded speakers. In other examples, one or more speakers associated with each display screen is positioned closer to the passenger seat associated with the respective display screen. In some examples, various speakers are directed to a selected passenger seat. In some examples, the passenger compartment includes directional speakers that are designed to produce sound at a particular passenger seat, with each passenger seat having one or more associated speakers. In some examples, a passenger has connected earphones or headphones through which audio output is played.

In various examples, the display screens 222, 224, an in-vehicle tablet, other screens, and/or one or more of the windows 232, 234, 212a, 212b, 214a, 214b are equipped to receive user input, e.g., through one or more buttons or through a touch screen. In other implementations, one or more user input devices are located elsewhere in the passenger compartment, e.g., on an armrest, and a passenger can control the windows 232, 234, 212a, 212b, 214a, 214b and/or screens 222, 224 (and/or speakers) using the user input devices. In other examples, a user can provide user input through an interface on a personal user device (e.g., an app running on the user device). In general, when displaying an augmented and/or reality image, the windows 232, 234, 212a, 212b, 214a, 214b are controlled together. In some examples, the windows 232, 234, 212a, 212b, 214a, 214b and/or screens 222, 224 are controlled individually. For example, the display screens 222, 224 can be controlled separately, so that each passenger has a different view on their respective display screen 222, 224. In another example, the windows 232, 234, 212a, 212b, 214a, 214b can be controlled separately so that each passenger has a different augmented and/or reality view through their respective window 212a, 212b, 214a, 214b, 232, 234. Passenger compartment speakers may be located at different points throughout the passenger compartment, and the speakers may be individually or jointly controlled.

In some examples, passenger compartment sensors, such as image sensors and microphones, are in communication with the augmented/virtual reality system. In some examples, to determine whether a seat has a seated passenger, the onboard computer 104 may perform an image detection algorithm on images captured by image sensors. As another example, the passenger compartment includes weight sensors incorporated into the passenger seats that transmit weight measurements to the onboard computer 104, and the onboard computer 104 determines based on the weight measurements whether each seat has a seated passenger. In other embodiments, the onboard computer 104 uses one or more other interior sensors (e.g., lidar, radar, thermal imaging, etc.) or a combination of sensors to identify the locations of passengers seated in the autonomous vehicle 110. In some implementations, the augmented/virtual reality system instructs image sensors directed at seats that have seated passengers to capture video, while other image sensors do not capture video. In some examples, weight and image sensors are used to recommend age-specific environments to passengers. For instance, based on weight detected in the car seats (and potentially integrating with computer vision from internal image sensors), the approximate age of each of one or more passengers can be estimated and age-appropriate augments and/or virtual reality environments can be recommended. Passenger age approximation can also be used to determine the types of content that are available to view or stream in the vehicle when children are present.

In some implementations, one or more of the windows 212a, 212b, 213a, 214b, 232, 234, and other output devices (e.g., speakers) are in communication with and are controlled by one or both of the augmented/virtual reality system and the onboard computer 104. In one example, the windows 212a, 212b, 213a, 214b, 232, 234, and associated speakers are in communication with and are controlled by the augmented/virtual reality system, while the display screens 222, 224 are in communication with and are controlled by the onboard computer 104. In another example, one or more of the windows 212a, 212b, 213a, 214b, 232, 234, and other output devices (e.g., speakers) are controlled by a separate computer (e.g., a computer integrated one of the windows or located elsewhere in the autonomous vehicle 110). The separate computer can be associated with the augmented/virtual reality system. In some examples, the computer controlling one or more of the windows 212a, 212b, 213a, 214b, 232, 234 is in communication with a fleet management system. The computer controlling the windows 212a, 212b, 213a, 214b, 232, 234 can receive user input from one or more input sources described above, such as a touch screen, microphone, buttons, user interface device, personal user device, or one or more other user input devices. The computer controlling the windows 212a, 212b, 213a, 214b, 232, 234 may or may not interact with the onboard computer 104.

Figure 2B:
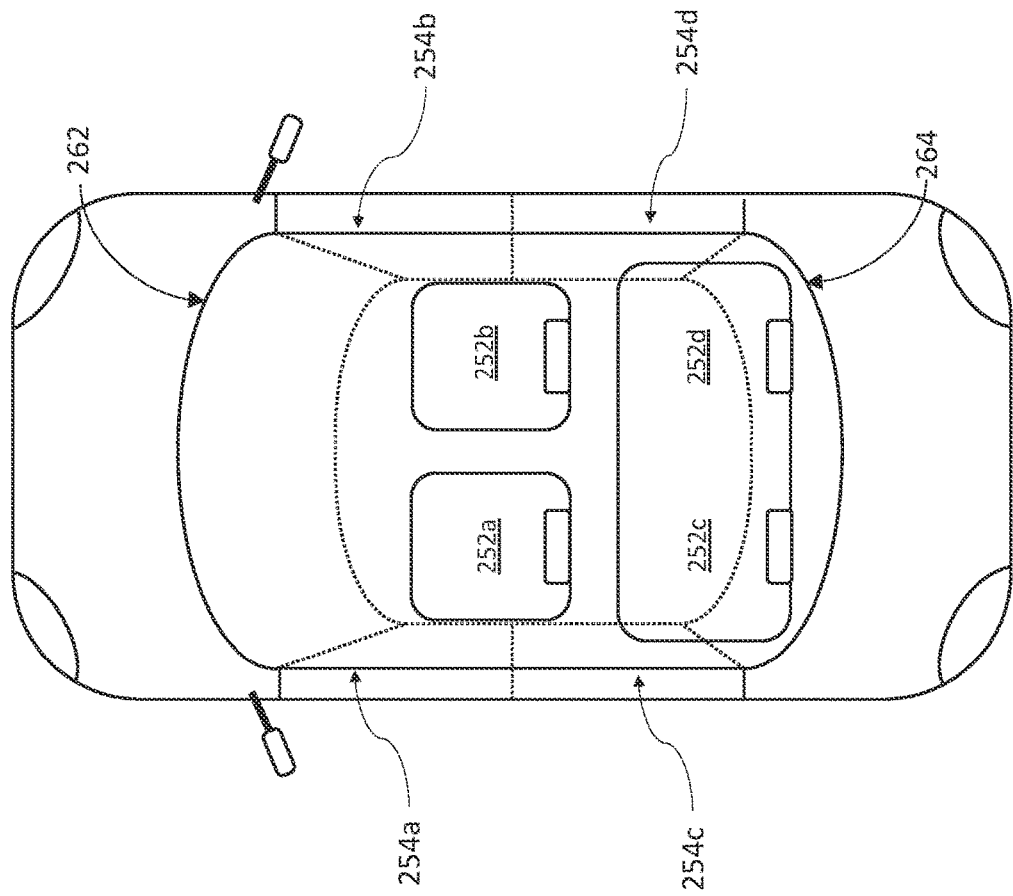

FIG. 2B shows a cutaway top view of an autonomous vehicle 250 with a different seating arrangement, according to various embodiments of the disclosure. As shown in FIG. 2B, there are four passenger seats 252a, 252b, 252c, 252d in the autonomous vehicle 110, arranged all facing forwards. Next to each passenger seat 252a, 252b, 252c, 252d is a window 254a, 254b, 254c, 254d. Additionally, there is a front window 262 and a rear window 264. In various examples, the windows 254a, 254b, 254c, 254d, 262, 264 can be used to display an augmented and/or virtual reality environment outside the vehicle 250, similar to the windows 212a, 212b, 214a, 214b, 232, 234 described above.

In various examples, the autonomous vehicle 250 can determine which seat each respective passenger is sitting in. That is, the autonomous vehicle 110 can determine that passenger A is sitting in the first seat 252a, passenger B is sitting in the second seat 252b, passenger C is sitting in the third seat 252c, and passenger D is sitting in the fourth seat 252d. In some examples, wireless technology such as NFC (Near Field Communication), Bluetooth, or inaudible sounds, can be used within the autonomous vehicle cabin to determine a passenger's mobile device location and infer passenger seat location. In some examples, an inaudible sound for mobile device location is a high frequency sound with a particular signature that is inaudible to humans but detectable by microphones. In various examples, the passenger mobile device can emit the inaudible sound and microphones in the autonomous vehicle detect the sound and determine device location. In some examples, multiple sensors are used to detect a signal and determine device location.

In some examples, computer vision can be used within the autonomous vehicle cabin to determine a passenger's seat location. In some examples, passengers are assigned a seat in the autonomous vehicle before entering the vehicle and informed of their designated seat via the rideshare application. The passenger can then confirm their seat location after entering the vehicle. In some examples, sensors determine that a passenger is sitting in a seat based on a seatbelt being buckled and/or using a seat weight sensor.

In alternate configurations, the passenger compartment has rows of seats in different configurations (e.g., two rows facing the same direction), more rows of seats, fewer rows of seats, one or more individual seats (e.g., bucket seats), or some combination of seats (e.g., one bench seat and two bucket seats). The arrangement of display screens and the image sensors may be different from the arrangement shown in FIGS. 2A and 2B based on the arrangement of the seats. In particular, the passenger compartment includes one or more display screens that are visible to each of the passenger seats, and image sensors that are positioned to capture a view of each passenger seat. In some embodiments, a single image sensor can capture a view of multiple passenger seats.

Example Method for Autonomous Vehicle Augmented Reality Experience

FIG. 3 is a diagram illustrating a method 300 for an augmented reality experience, according to some embodiments of the disclosure. According to various examples, the method 300 begins after a passenger has selected an augmented reality experience. At step 302, the location of the autonomous vehicle is determined. Based on the autonomous vehicle location, at step 304, map data for the location is acquired. Map data includes information about structures such as buildings, shops, statues, signs, hydrants, trees, and other landmarks. Map data can include information about static structures as well as information about moveable items such as parked vehicles, tents, markets, and roadwork. Map data can include images, LIDAR data, granular labeling, as well as other features.

In various examples, map data is received at the autonomous vehicle from a central computing system. The map data can be stored on the autonomous vehicle onboard computer or on another autonomous vehicle computer. The map data can be stored in an augmented reality system computer. The map data is periodically updated. In particular, the central computer receives updated map data from autonomous vehicles in the autonomous vehicle fleet as the autonomous vehicles drive and sense environmental information, for example through the autonomous vehicle sensor suite. In particular, the central computer receives updated map data from fleet vehicle sensors, processes the updated information, and updates central maps. In various examples, the central computer updates its maps daily, hourly, every few minutes, or more frequently.

Additionally, the autonomous vehicle periodically requests and/or receives updated map data from the central computer. In various examples, the autonomous vehicle receives updated map data weekly, daily, hourly, before each ride, or more frequently. The map data is used by the augmented reality system in generating augmented reality images of the environment around the vehicle.

At step 306, the autonomous vehicle captures an image using an image sensor. In particular, the autonomous vehicle captures images of the environment around the vehicle. Thus, the image sensors capture images of scenes external to the vehicle. Additional image sensors can also capture images inside the vehicle. In addition to image sensors, other vehicle sensors capture information about the environment outside the vehicle, including LIDAR and RADAR sensors. In particular, in addition to camera images, the augmented reality system can use LIDAR point clouds, radar feeds, and ultraprecise GPS coordinates. The autonomous vehicle can continuously and/or repeatedly capture images of the environment outside the vehicle, as the environment around the vehicle can be constantly changing as the vehicle moves and as objects (e.g., people, animals, and other vehicles) move around the vehicle.

At step 308, the image captured at step 306 is analyzed. Analyzing the image includes identifying various objects in the image, and can include matching objects in the image to objects in the map data. In particular, autonomous vehicle perception systems can be used in analyzing sensor data to identify and understand the objects in the environment. Identifying objects can include identifying raindrops, fog, and other general weather data.

At step 310, an augmented reality image is generated based on the image analysis and perception system analysis. The perception system can be used, for example, to place objects with real world coordinates into 3D space, as well as to add filters, skins, and/or textures on top of existing objects. The augmented reality image can include objects and/or features of the original image augmented in a variety of ways, as described in greater detail below. Additionally, at step 310, other augmented reality data can be generated, such as sound data. Sound data can include background sounds such as rain or the sounds of other vehicles, and it can include directed audio such as a spoken description of a landmark or a roar of a virtual animal visible in the augmented reality image. In some examples, the augmented reality data includes haptic data such as seat movements or a mist in the air.

At step 312, the augmented reality image is displayed. The augmented reality image can be displayed through augmented reality glasses or on one or more autonomous vehicle windows. In some examples, the interior windows become immersive interior window screens. For example, the windows can transform from transparent glass to opaque digital screens. In another example, surface projectors are used on the interior windows. In some examples, lenticular displays with eye tracking are used to allow for multiple viewing angles and perspective shifts when multiple riders are in the vehicle. In some examples, the augmented reality image extends into the vehicle, such that an object from the scene (e.g., an animal) appears to be inside the vehicle. Step 312 can include playing related sound data or generating the augmented reality haptic output.

According to various implementations, the method 300 described above can be used to provide virtual reality experience, by replacing the exterior environment with a different exterior environment.

Figure 4:
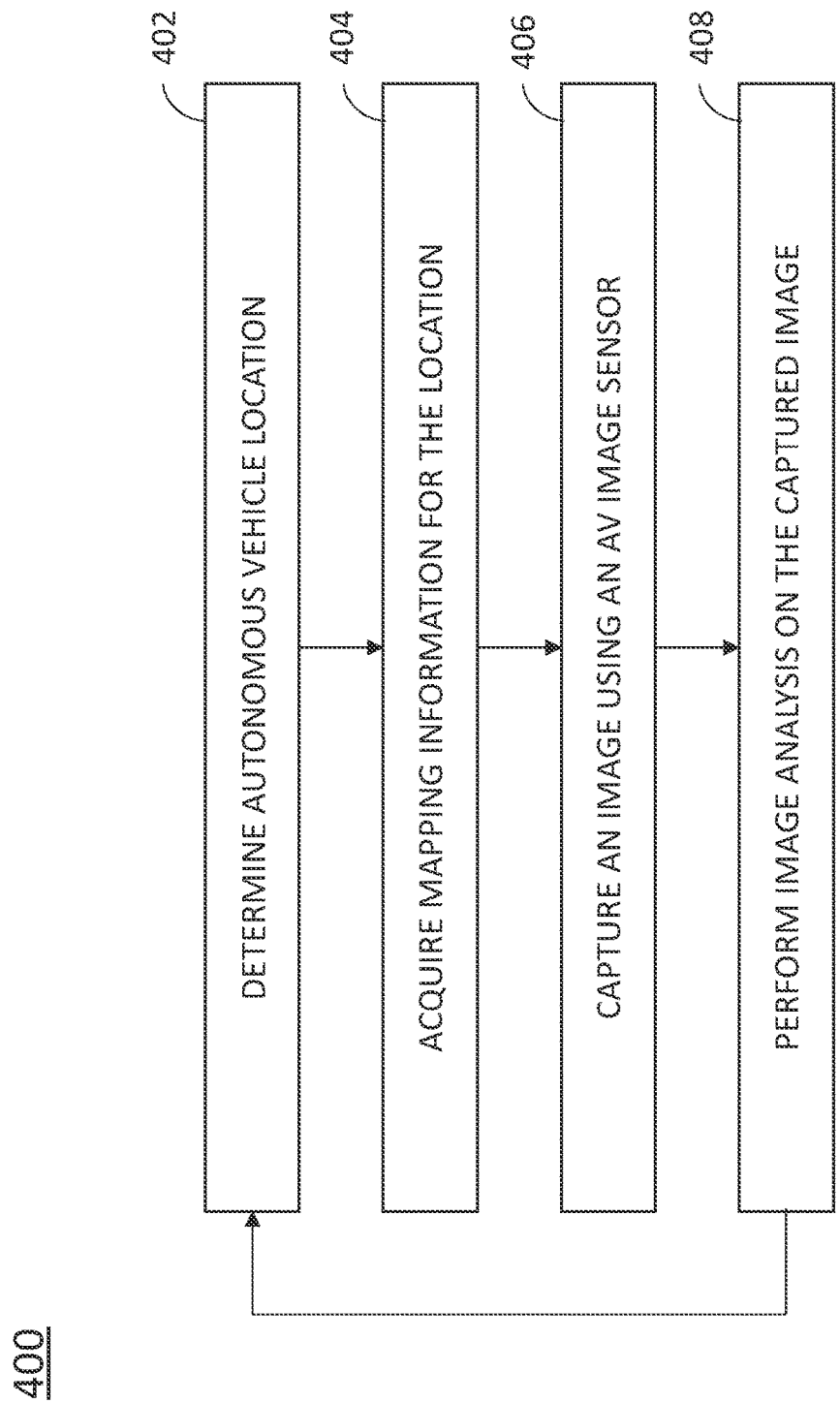
FIG. 4 shows a method for an augmented reality system in an autonomous vehicle, according to some embodiments of the disclosure.

FIG. 4 shows a method 400 for an augmented reality system in an autonomous vehicle, according to some embodiments of the disclosure. According to various examples, the method 400 begins after a passenger has selected an augmented reality experience. At step 402, autonomous vehicle ride data is determined. In particular, core trip data such as pick-up location, drop-off location, and planned route are determined. The vehicle ride data continues to be collected while the vehicle is driving, and includes a live feed of camera images, LIDAR point clouds, radar feeds, and precise GPS coordinates. The vehicle ride data includes detailed map data, as described above, including images, LIDAR data, and granular labels.

At step 404, augmenting data is acquired. The augmenting data can come from a variety of sources, including the autonomous vehicle augmented reality system and 3D models, as well as third party data sets. Third party data sets may include information such as historical landmark data.

At step 406, the vehicle ride data is mapped to the augmenting data in 3D space. The autonomous vehicle has a highly evolved understanding of its environment and the objects in the environment. In particular, the autonomous vehicle includes perception systems that process sensor data to understand the environment around the vehicle. Using these systems, the autonomous vehicle can place objects with real world coordinates into 3D space. For example, the autonomous vehicle sensor suite can map the data by identifying a point in space and swapping out the point in space with a pre-built 3D asset from a selected library (e.g., a library corresponding to a theme selected by the user) containing texture maps and surface detail. The textures and/or surface items are embedded as part of the 3D asset being placed in the scene and help to create an enriching augmented experience. In various examples, the process for placing objects with real world coordinates into 3D space occurs in real time. Additionally, using these systems, the augmented reality system can add one or more of filters, skins, and textures on top of existing objects in an abstract way to generate the augmented reality image.

In some examples, skins and/or filters are two-dimensional (2D) overlays on an image. In some examples, texture maps are images that are wrapped onto a 3D model such that when a 3D object moves, rotates, bends, stretches, scales, animates, or otherwise changes, the texture map is contoured to the model with precision as the model (or camera) moves through space. When an image with a texture map changes, the texture map changes in perspective with the various objects and other parts of the image. For instance, brick details, roof tiles, and signage can be added to a building in place and appear realistic. Similarly, a cloak can be added to a person, or scales can be added to a dog, and the added texture moves in perspective with the person or animal and appears realistic. Thus, texture maps can be used to generate a more realistic experience.

In various examples, a user can select the type of experience generated, and different experiences can use different skins, filters, and/or texture maps. In one example, a user can select an experience that uses skins and/or filters. In another example, a user can select an experience that uses texture maps. In some examples, an experience can incorporate the use of skins, filters, and texture maps.

At step 408, the augmented data is displayed to passengers inside the autonomous vehicle. As described above with respect to FIG. 3, the augmented data can be displayed through augmented reality glasses or through immersive interior window screens and surface projectors. That is, the interior windows can become immersive interior window screens, and the windows can transform from transparent glass to opaque digital screens. In some examples, lenticular displays with eye tracking are used to allow for multiple viewing angles and perspective shifts when multiple riders are in the vehicle.

According to various implementations, the method 400 described above can be used to provide virtual reality experience, by replacing the exterior environment with a different exterior environment.

According to various implementations, map data includes high precision map data. In some examples, high precision maps include layers of information in addition to roadway maps and can be used for routing and directing autonomous vehicles. The layers of information can include data about objects visible from roadways, such as buildings, landmarks, signs, traffic lights, hydrants, roadwork, parked vehicles, etc. The layers of information can also include, for example, expected traffic patterns and/or traffic density at various times of day and on various days of the week. When autonomous vehicles travel around an area, the autonomous vehicles record and provide feedback on the surrounding environment to a central computer. The high precision map is updated to include current environment data, and the updated high precision map can be used by other autonomous vehicles and by augmented reality systems in other autonomous vehicles in generating augmented reality environments. Autonomous vehicles can also record and provide feedback on events that are encountered, such as roadwork, including where and when the events are encountered. The high precision maps can include a layer marking waypoints for various events. Data analysis from previous autonomous vehicle routes can also determine timeframes during which selected events are more likely to occur in selected locations and these locations and times can be included as identified waypoints for test vehicle routing.

Examples of Autonomous Vehicle Augmented Reality Experiences

Figure 5:
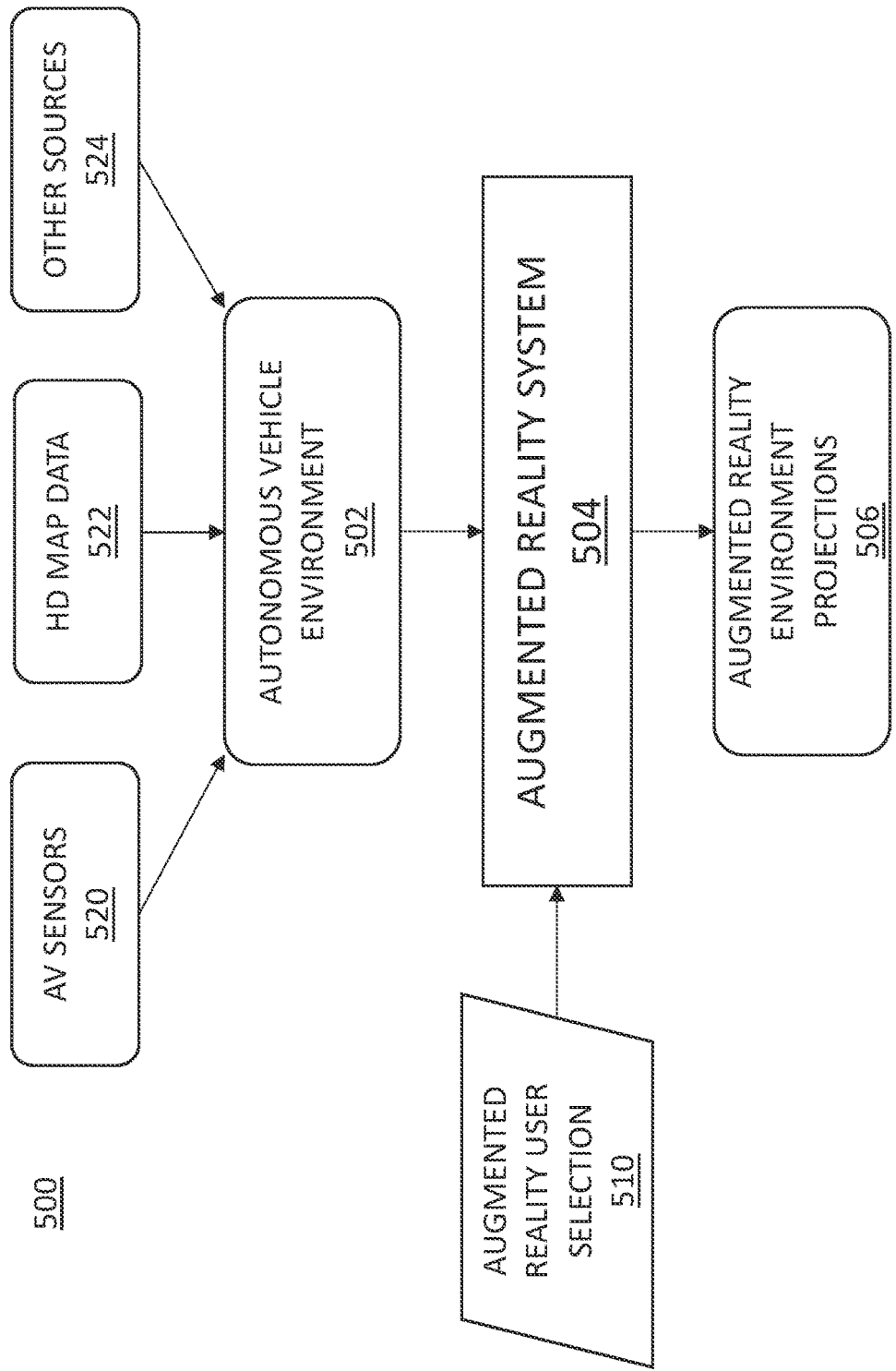
FIG. 5 shows a block diagram of the inputs to an autonomous vehicle augmented reality system, according to some embodiments of the disclosure.

There are many potential augmented reality experiences that can be provided in an autonomous vehicle using the methods 300 and 400 described above. FIG. 5 shows a block diagram of the inputs to an autonomous vehicle augmented reality system 504, according to various embodiments of the disclosure. In particular, an autonomous vehicle real world environment 502 is used by the augmented reality system 504, and the autonomous vehicle real world environment 502 is determined using several inputs. The inputs to the autonomous vehicle real world environment 502 include autonomous vehicle sensor data 520, map data 522, and input from other sources 524. The autonomous vehicle sensor data 520 includes data from autonomous vehicle cameras, LIDAR, radar, and other sensors. The autonomous vehicle map data 522 includes high definition, ultra-detailed maps used by the autonomous vehicle fleet for autonomous driving functions. The other sources of input from other sources 524 includes historical data, both data generated by autonomous vehicles and other data input to the system, 3D assets, including 3D models input into the system, as well as any other data sources. The autonomous vehicle real world environment 502 uses the various inputs to generate proprietary ultra-detailed maps, which are then input to the augmented reality system 504.

The augmented reality system 504 receives as input the autonomous vehicle real world environment 502, as well as a user selection 510 indicating the selected augmented reality experience, and generates an augmented reality environment projection 506. For the user selection 510, in various examples, a user is presented with the various augmented reality experience options either before entering the autonomous vehicle via a ridehail application on the user mobile device or inside the vehicle. In some examples, once the user enters the autonomous vehicle, the augmented reality experience options can be presented to the user on the user mobile device, the augmented reality experience options can be presented on an in-vehicle tablet, and the augmented reality experience options can be presented on an in-vehicle display screen. In various examples, augmented reality experience options include virtual reality experiences.

In some implementations, augmented reality experience offerings include various world filters. World filters transform the real world by applying various virtual themes and effects on top of the real world scene, similar to social media camera filters. One example of a world filter is a Harry Potter theme filter, which turns local architecture into gothic architecture, transforms tracked objects such as cars and bikes into wizarding world equivalents such as horse-drawn carriages and flying broomsticks, dresses pedestrians in wizard garb such as cloaks, and adds flying 3D assets such as owls, dementors, and other fictitious characters into the environment. Another example of a world filter is to apply a weather filter onto the world to change a mid-summer environment into a winter wonderland or to turn a dreary winter environment into a sunny mid-summer day environment. In some examples, a weather filter can provide a user with an experience that is unlikely to ever occur in real life, such as a snowy day in San Diego. Another example of a world filter is a time filter that changes the time of day from a daytime ride to a starry-skied nighttime, from a dark nighttime ride to a sunny daytime ride, from darkening evening to brightening morning, or any other selected time change. Note that a time filter could have benefits for helping passengers overcome jetlag. Another potential benefit of a time filter is to help passengers with seasonal affective disorder by providing extra light. In another example, the world filter effects are applied dynamically depending on a driving-based variable. For instance, a motion blur effect can be applied to the environment that increases exponentially as the vehicle's velocity increases. In various examples, augmented reality audio is added to the world filters.

In some implementations, augmented reality experience offerings include various time machine filters. Time machine filters transform the real world by showing the view of the location during a different time-period. For instance, a ride through Paris with a time machine filter augmented reality selection can display, through autonomous vehicle windows, Paris as it appeared a hundred years ago. In another example, a ride through New York City can showcase its evolution through the 1800s, 1900s, and modern day in real-time, displaying animations of construction and destruction throughout the years. To provide a time machine filter, historical data is gathered and provided to the augmented reality system. The historical data can include, for example, 3D models from various time periods and the GPS locations of the 3D models.

In some implementations, augmented reality experience offerings include various annotated city filters. Annotated city filters use autonomous vehicle computer vision algorithms and map data to recognize landmarks in real-time and annotate recognized landmarks with interesting data. In one example, a landmark is labeled with its name and a short description, as well as historical context. A passenger can be presented with the option to add a stop at any labeled landmark or other object. Additionally, a passenger may have the option to play an audio clip about a labeled landmark that may include its history, past and current uses, and other interesting facts about the landmark. In some examples, passengers can use the annotated city filters to tour a city.

In some implementations, augmented reality experience offerings include various technology explanation filters. Technology explanation filters explain the automated input considerations and processing behind the vehicle's decisions by annotating the real world with the vehicle's planned route, tracked object, maneuver intents, and other automated driving decisions. In some examples, passengers can interact with the annotations to learn more. For instance, a passenger can learn about the sensor data behind the annotations, as well as about the processing behind various decisions.

In some implementations, augmented reality experience offerings include various teleportation filters. Teleportation filters present a different world entirely from that outside the vehicle, completely replacing the passenger's perceived environment rather than augmenting or annotating it. Thus, teleportation filters can be considered virtual reality filters. In some examples, procedurally generated 3D environments are leveraged to match the vehicle's route to a completely different world. For instance, the passenger can select a space travel environment and the augmented reality system will present an environment that makes it seem as if the passenger is riding in a rover on the moon. In another example, the passenger can select an underwater environment and the augmented reality system will present an environment that makes it seem as if the passenger is riding in a submarine. Similarly, in another example, the passenger can select a safari environment and the augmented reality system will present an environment that makes it seem as if the passenger is riding in a Jeep on an African safari.

In another example of the teleportation filter, the passenger can select a teleportation filter that presents a different city from the city the passenger is actually traveling in. In this example, live or historical video feeds from other autonomous vehicles in the fleet that are driving in other cities around the world can be used to create the virtual reality environment. In one example, various live or historical video feeds can be stitched together to generate an immersive driving experience. For instance, a passenger in San Francisco can choose to follow a vehicle in Tokyo or Dubai. In some examples, the virtual reality environment is configured to match the real world driving route, such that when the vehicle turns a corner, the view in the virtual reality environment also turns a corner. To accomplish this, and match the virtual reality environment with the real world driving route, in some examples, a virtual reality environment can wipe elements to move from one scene to another. In some examples, the virtual reality environment can cross-dissolve elements, or the virtual reality environment can show a fog to move from one scene to the next scene.

In some implementations, augmented reality experience offerings include gaming filters. Gaming filters augment reality by gamifying the real world experience to make it more engaging. In various examples, many of the augmented reality examples described herein can be gamified. In particular, a gaming filter allows passengers to interact with augmented reality elements and/or modify the environment in real-time. In some examples, a gaming filter allows a passenger to play a multi-player game with other passengers. The other passengers can be in the same vehicle or in a different vehicle. A gaming filter can include allowing a passenger to use a personal mobile device as a controller or interface to the game, or an in-vehicle tablet or screen can be the game interface. In one example, a game can include targeting various items in the augmented reality environment, such as targeting and clicking on augmented reality birds in the sky.

According to various implementations, on any given autonomous vehicle ride, a passenger can enable any of these augmented (or virtual) reality experiences and customize the selected experience to the passenger's preference. For example, the world filters experience can have many options to choose from, and the options can be pre-set for selection or added by other users.

Example of Autonomous Vehicle Fleet

Figure 6:
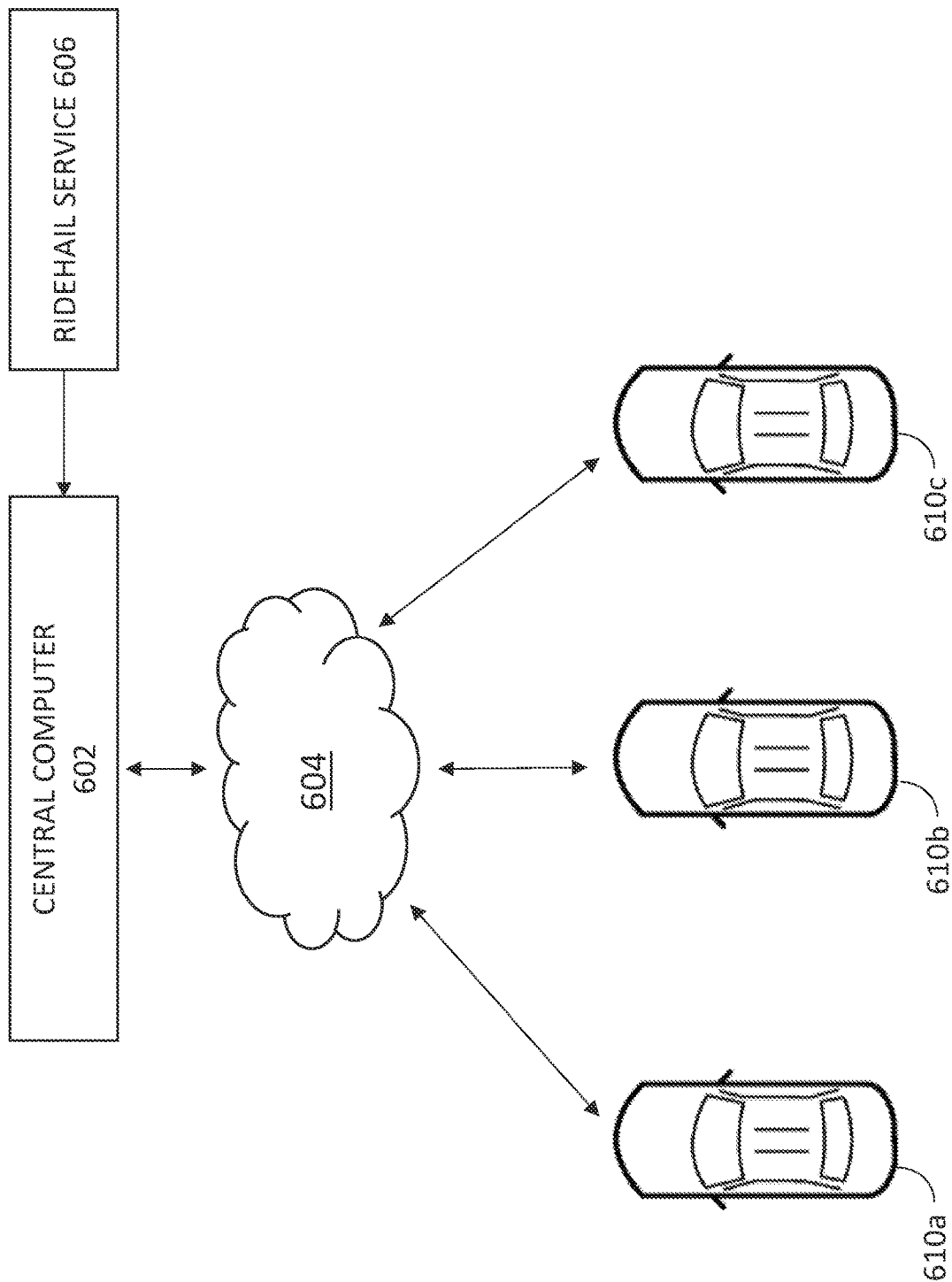
FIG. 6 is a diagram illustrating a fleet of autonomous vehicles in communication with a central computer, according to some embodiments of the disclosure.

FIG. 6 is a diagram 600 illustrating a fleet of autonomous vehicles 610a, 610b, 610c in communication with a central computer 602, according to some embodiments of the disclosure. The vehicles 610a-610c communicate wirelessly with a cloud 604 and a central computer 602. The central computer 602 includes a routing coordinator and a database of information from the vehicles 610a-610c in the fleet. Autonomous vehicle fleet routing refers to the routing of multiple vehicles in a fleet. The central computer also acts as a centralized ride management system and communicates with ridehail users via a ridehail service 606. Via the ridehail service 606, the central computer receives ride requests from various user ridehail applications. In some implementations, the ride requests include an in-vehicle augmented reality selection. In some examples, after receiving a ride request, the ridehail service 606 provides an interface for the user to select an augmented reality experience. In some implementations, the autonomous vehicles 610a-610c communicate directly with each other.

When a ride request is entered at a ridehail service 606, the ridehail service 606 sends the request to the central computer 602. If the ridehail request is for a future date, the central computer 602 stores the information for future routing determinations. In some examples, on the day of the ride request, during a selected period of time before the ride begins, the vehicle to fulfill the request is selected and route for the vehicle is generated by the routing coordinator. In other examples, the vehicle to fulfill the request is selected and the route for the vehicle is generated by the onboard computer on the autonomous vehicle. In various examples, information pertaining to the ride, such as passenger augmented reality experience selection, is transmitted to the selected vehicle 610a-610c. With shared rides, the route for the vehicle can depend on other passenger pick-up and drop-off locations. Each of the autonomous vehicles 610a, 610b, 610c in the fleet are equipped to provide an augmented reality experience as described above with respect to FIGS. 3-5. The vehicles 610a, 610b, 610c communicate with the central computer 602 via the cloud 604.

As described above, each vehicle 610a-610c in the fleet of vehicles communicates with a routing coordinator. Thus, information gathered by various autonomous vehicles 610a-610c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, a traveling preference includes a request for a longer ride to accommodate planned in-vehicle activities, such as augmented reality experiences. In some examples, the routing coordinator uses collected position data corresponding to emergency events to generate a best route for an autonomous vehicle to avoid a potential emergency situation and associated unknowns. In some examples, a vehicle route is updated to add a stop selected during an augmented reality experience, such as when a passenger sees an annotated landmark and chooses to add the landmark as an intermediate stop on the ride.

According to various implementations, a set of parameters can be established that determine which metrics are considered (and to what extent) in determining routes or route modifications. For example, expected congestion or traffic based on a known event can be considered. In another example, the augmented reality system can influence routing if an augmented reality experience includes a reason to pass by a selected landmark, such as a local tour or a historical tour. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pickup location and destination location, and an onboard computer on the selected autonomous vehicle generates a route and navigates to the destination. In some implementations, the routing coordinator in the central computer 602 generates a route for each selected autonomous vehicle 610a-610c, and the routing coordinator determines a route for the autonomous vehicle 610a-610c to travel from the autonomous vehicle's current location to a first destination.

Example of a Computing System for Ride Requests

Figure 7:
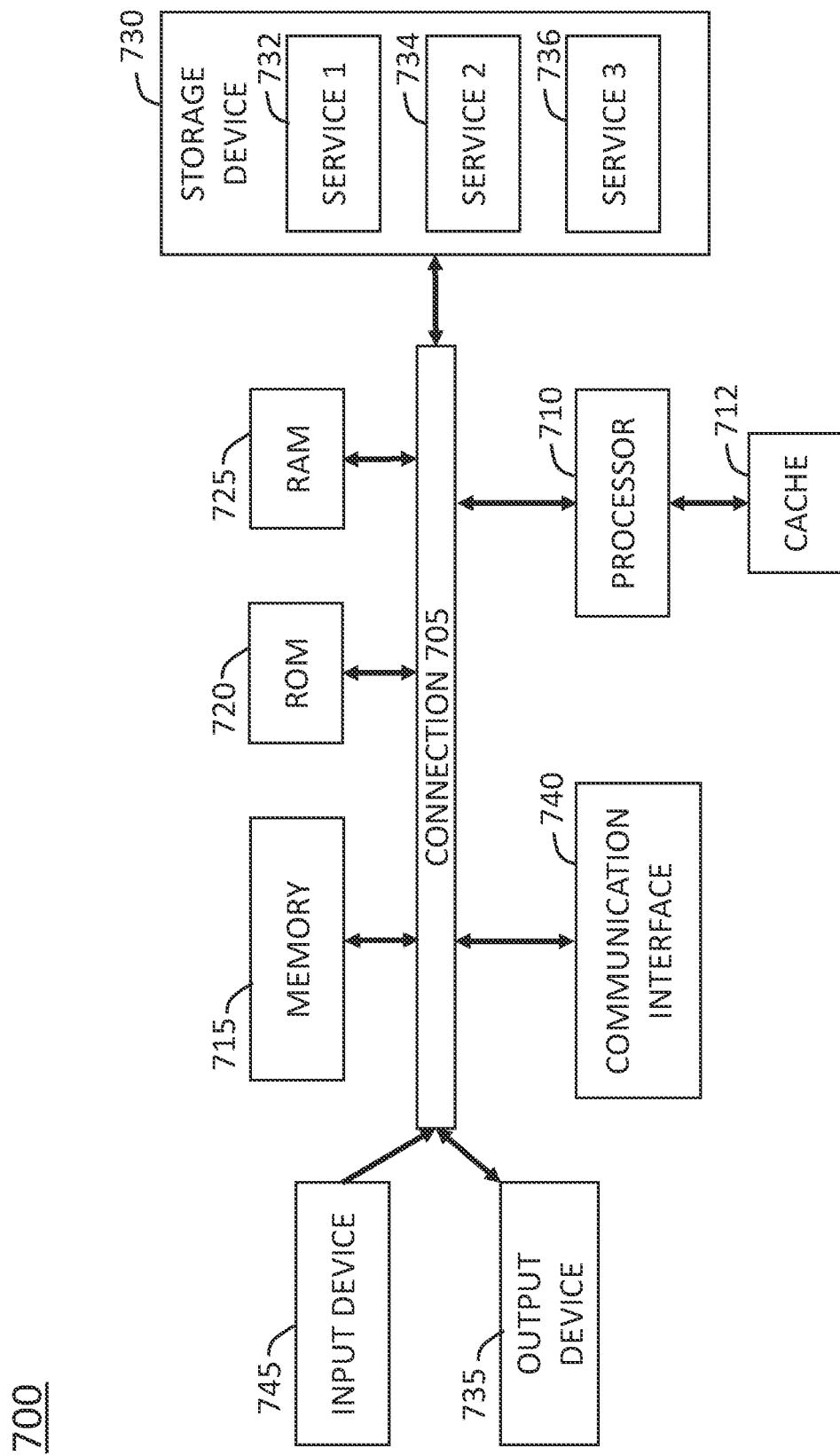
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computer 602, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROMs, and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for augmented reality in a vehicle, comprising: determining vehicle ride data, including vehicle location and vehicle sensor data; acquiring map data for the vehicle location from a central computer; analyzing vehicle sensor data including captured images to identify image objects; generating an augmented reality image by augmenting the captured images based on the identified image objects, the vehicle location, and the map data; and projecting the augmented reality image in the vehicle.

Example 2 provides a method, system, and/or vehicle according to one or more of the preceding and/or following examples, wherein generating the augmented reality image further comprises matching vehicle sensor data with the map data.

Example 3 provides a method, system, and/or vehicle according to one or more of the preceding and/or following examples, wherein determining vehicle sensor data includes capturing an image using a vehicle image sensor.

Example 4 provides a method, system, and/or vehicle according to one or more of the preceding and/or following examples, wherein determining vehicle sensor data includes processing LIDAR data, weather data, and detected object data.

Example 5 provides a method, system, and/or vehicle according to one or more of the preceding and/or following examples, wherein projecting the augmented reality image includes at least one of projecting the augmented reality image on at least one window, projecting the augmented reality image in augmented reality glasses, and projecting the augmented reality image on an in-vehicle screen.

Example 6 provides a method, system, and/or vehicle according to one or more of the preceding and/or following examples, wherein generating the augmented reality image further comprises generating the augmented reality image based on a ride route.

Example 7 provides a method, system, and/or vehicle according to one or more of the preceding and/or following examples, wherein the identified image objects include buildings and wherein generating the augmented reality image further comprises changing an appearance of the buildings.

Example 8 provides a method, system, and/or vehicle according to one or more of the preceding and/or following examples, wherein generating the augmented reality image further comprises changing the captured images to adjust at least one of a time of day and weather.

Example 9 provides a method, system, and/or vehicle according to one or more of the preceding and/or following examples, wherein the map data includes time-period data from a different era and wherein generating the augmented reality image further comprises using the time-period data.

Example 10 provides a method, system, and/or vehicle according to one or more of the preceding and/or following examples, further comprising generating an augmented reality sound and playing the sound in the vehicle.

Example 11 provides a method, system, and/or vehicle according to one or more of the preceding and/or following examples, wherein the augmented reality sound includes at least one of a weather sound and an animal sound.

Example 12 provides a method, system, and/or vehicle according to one or more of the preceding and/or following examples, wherein the augmented reality image includes a first image portion outside the autonomous vehicle and a second image portion inside the autonomous vehicle.

Example 13 provides a vehicle for providing an augmented reality environment, comprising: a sensor suite including external vehicle sensors to sense a vehicle environment and generate sensor data; a perception system to receive the sensor data and to acquire map data and to use the map data and the sensor data to generate autonomous vehicle real world environment data; and an augmented reality system to: receive the real world environment data, receive an augmented reality user selection, generate an augmented reality environment based on the user selection, and project the augmented reality environment.

Example 14 provides a method, system, and/or vehicle according to one or more of the preceding and/or following examples, wherein the augmented reality system projects the augmented reality environment on at least one vehicle window.

Example 15 provides a method, system, and/or vehicle according to one or more of the preceding and/or following examples, further comprising an onboard computer configured to adjust vehicle cabin settings based on the augmented reality environment.

Example 16 provides a method, system, and/or vehicle according to one or more of the preceding and/or following examples, wherein the onboard computer is further to: receive an augmented reality system request, and adjust a vehicle route based on the request.

Example 17 provides a method, system, and/or vehicle according to one or more of the preceding and/or following examples, wherein the sensor data is at least one of image data, LIDAR data, weather data, and detected object data, and wherein the augmented reality system is to incorporate the sensor data into the augmented reality environment.

Example 18 provides a method, system, and/or vehicle according to one or more of the preceding and/or following examples, wherein the augmented reality system is further to match vehicle sensor data with the map data.

Example 19 provides an augmented reality environment, comprising: a central computer to transmit map data; and a vehicle including: a sensor suite including external vehicle sensors to sense a vehicle environment and generate sensor data; a perception system to receive the sensor data and to receive the map data and to use the map data and the sensor data to generate vehicle real world environment data; and an augmented reality system to: receive the real world environment data, receive an augmented reality user selection, generate an augmented reality environment based on the user selection, and project the augmented reality environment.

Example 20 provides a method, system, and/or vehicle according to one or more of the preceding and/or following examples, wherein the central computer is further to store the map data, receive map data updates, and update the map data.

Example 21 provides a method, system, and/or vehicle according to one or more of the preceding and/or following examples, wherein the augmented reality system projects the augmented reality environment on at least one vehicle window.

Example 22 provides a method, system, and/or vehicle according to one or more of the preceding and/or following examples, further comprising an onboard computer configured to adjust autonomous vehicle cabin settings based on the augmented reality environment.

Example 23 provides a method, system, and/or vehicle according to one or more of the preceding and/or following examples, wherein the sensor data is at least one of image data, LIDAR data, weather data, and detected object data, and wherein the augmented reality system is to incorporate the sensor data into the augmented reality environment.

Example 24 provides a method, system, and/or vehicle according to one or more of the preceding and/or following examples, wherein the vehicle is an autonomous vehicle.

Example 25 provides an augmented reality environment, comprising: a central computer to transmit map data; and an autonomous vehicle including: a sensor suite including external vehicle sensors to sense an autonomous vehicle environment and generate sensor data; a perception system to receive the sensor data and to receive the map data and to use the map data and the sensor data to generate autonomous vehicle real world environment data; and an augmented reality system to: receive the real world environment data, receive an augmented reality user selection, generate an augmented reality environment based on the user selection, and project the augmented reality environment.

Example 26 provides an autonomous vehicle for providing an augmented reality environment, comprising: a sensor suite including external vehicle sensors to sense an autonomous vehicle environment and generate sensor data; a perception system to receive the sensor data and to acquire map data and to use the map data and the sensor data to generate autonomous vehicle real world environment data; and an augmented reality system to: receive the real world environment data, receive an augmented reality user selection, generate an augmented reality environment based on the user selection, and project the augmented reality environment.

Example 27 provides a method for augmented reality in an autonomous vehicle, comprising: determining autonomous vehicle ride data, including vehicle location and vehicle sensor data; acquiring map data for the vehicle location from a central computer; analyzing autonomous vehicle sensor data including captured images to identify image objects; generating an augmented reality image by augmenting the captured images based on the identified image objects, the vehicle location, and the map data; and projecting the augmented reality image in the vehicle.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, or one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for augmented reality in a vehicle, comprising:
   determining vehicle ride data, including vehicle location and vehicle sensor data;
   acquiring map data for the vehicle location from a central computer;
   analyzing vehicle sensor data including captured images to identify image objects;
   generating an augmented reality image by augmenting the captured images based on the identified image objects, the vehicle location, and the map data;
   projecting the augmented reality image in the vehicle, including projecting the augmented reality image on the windows of the vehicle to display a continuous augmented reality scene surrounding the vehicle; and
   displaying one of vehicle ride information and entertainment on a display screen inside the vehicle, wherein the display screen extends into an interior of the vehicle and wherein the display screen is different from a vehicle window.

2. The method of claim 1, wherein determining vehicle sensor data includes processing LIDAR data, RADAR data, weather data, and detected object data, and wherein generating the augmented reality image further comprises matching vehicle sensor data with the map data.

3. The method of claim 1, wherein generating the augmented reality image further comprises generating the augmented reality image based on a ride route, including matching image objects to map data objects on the ride route.

4. The method of claim 1, wherein the identified image objects include buildings and wherein generating the augmented reality image further comprises changing an appearance of the buildings.

5. The method of claim 1, wherein generating the augmented reality image further comprises changing the captured images to adjust at least one of a time of day and weather, wherein the captured images are current images from a real world environment around the vehicle and changing the captured images includes adjusting the real world environment to the continuous augmented reality scene surrounding the vehicle.

6. The method of claim 1, wherein the map data includes time-period data from a different era and wherein generating the augmented reality image further comprises applying a time machine filter using the time-period data to project a view of an historical scene around the vehicle during the different era, wherein the historical scene is based on 3D models of historical data from the different era.

7. The method of claim 6, wherein generating the augmented reality image further comprises displaying animations of construction and destruction over a selected period of time.

8. The method of claim 1, further comprising estimating a passenger age, and recommending an age-appropriate augmented reality scene from a set of age-specific environments.

9. The method of claim 1, wherein generating the augmented reality image further comprises applying a world filter, wherein the world filter adjusts local architecture, transforms tracked objects into world filter equivalents, and adds flying 3D assets.

10. The method of claim 1, wherein generating the augmented reality image further comprises applying a motion blur effect wherein an amount of blurring of the motion blur effect increases as a velocity of the vehicle increases.

11. A vehicle for providing an augmented reality environment, comprising:
    a sensor suite including external vehicle sensors to sense a vehicle environment and generate sensor data;
    a perception system to receive the sensor data and to acquire map data and to use the map data and the sensor data to generate vehicle real world environment data; and
    an augmented reality system to:
      receive the real world environment data,
      receive an augmented reality user selection,
      generate an augmented reality environment based on the user selection, and
      project the augmented reality environment on the windows of the vehicle to display a continuous augmented reality scene surrounding the vehicle; and
    a display screen inside the vehicle, wherein the display screen extends into an interior of the vehicle and wherein the display screen is different from vehicle windows, the display screen configured to display one of vehicle ride information, a movie, a show, and a game.

12. The vehicle of claim 11, further comprising an onboard computer configured to adjust vehicle cabin settings based on the augmented reality environment.

13. The vehicle of claim 12, wherein the onboard computer is further to:
    receive an augmented reality system request, and
    adjust a vehicle route based on the request.

14. The vehicle of claim 11, wherein the sensor data is at least one of image data, LIDAR data, RADAR data, weather data, and detected object data, and wherein the augmented reality system is to incorporate the sensor data into the augmented reality environment.

15. The vehicle of claim 11, wherein the augmented reality system is further to match vehicle sensor data with the map data.

16. The vehicle of claim 11, wherein the windows are lenticular displays with eye tracking, and wherein the windows display multiple different view angles and perspective shifts based on positions of vehicle passengers.

17. A system for providing an augmented reality environment, comprising:
  a central computer to transmit map data; and
  a vehicle including:
    a sensor suite including external vehicle sensors to sense a vehicle environment and generate sensor data;
    a perception system to receive the sensor data and to receive the map data and to use the map data and the sensor data to generate vehicle real world environment data; and
    an augmented reality system to:
      receive the real world environment data,
      receive an augmented reality user selection,
      generate an augmented reality environment based on the user selection, and
      project the augmented reality environment on the windows of the vehicle to display a continuous augmented reality scene surrounding the vehicle; and
    a display screen inside the vehicle, wherein the display screen extends into an interior of the vehicle and wherein the display screen is different from vehicle windows, the display screen configured to display one of vehicle ride information, a movie, a show, and a game.

18. The system of claim 17, wherein the central computer is further to store the map data, receive map data updates, and update the map data.

19. The system of claim 17, further comprising an onboard computer configured to adjust vehicle cabin settings based on the augmented reality environment.

20. The system of claim 17, wherein the sensor data is at least one of image data, LIDAR data, RADAR data, weather data, and detected object data, and wherein the augmented reality system is to incorporate the sensor data into the augmented reality environment.

* * * * *